United States Patent
Roppongi et al.

(10) Patent No.: US 10,122,303 B2
(45) Date of Patent: Nov. 6, 2018

(54) MOTOR CONTROL DEVICE

(71) Applicant: Mitsuba Corporation, Kiryu-shi (JP)

(72) Inventors: Hitoshi Roppongi, Kiryu (JP); Kazuya Tateoka, Kiryu (JP); Katsuhiro Tanino, Kiryu (JP); Atsushi Nakamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 14/389,803

(22) PCT Filed: Apr. 16, 2013

(86) PCT No.: PCT/JP2013/061278
§ 371 (c)(1),
(2) Date: Oct. 1, 2014

(87) PCT Pub. No.: WO2013/157542
PCT Pub. Date: Oct. 24, 2013

(65) Prior Publication Data
US 2015/0061561 A1    Mar. 5, 2015

(30) Foreign Application Priority Data

Apr. 18, 2012  (JP) ................. 2012-094924
Nov. 28, 2012  (JP) ................. 2012-260120

(51) Int. Cl.
*B60L 3/04*    (2006.01)
*H02P 3/02*    (2006.01)
(Continued)

(52) U.S. Cl.
CPC ............ *H02P 3/025* (2013.01); *E05F 15/646* (2015.01); *E05F 15/70* (2015.01); *H02P 6/085* (2013.01);
(Continued)

(58) Field of Classification Search
CPC .. B60L 15/20; H02P 6/16; H02P 23/06; H02P 7/29; H02P 23/14
See application file for complete search history.

(56) References Cited

U.S. PATENT DOCUMENTS 6,863,336 B2 *  3/2005  Yokomori .................. B60J 5/06
                                                    296/146.4
7,170,245 B2 *  1/2007  Youm ............... H02M 7/53875
                                                    318/268

(Continued)

FOREIGN PATENT DOCUMENTS

JP    06-013915 A    2/1994
JP    09-070195 A    3/1997
(Continued)

OTHER PUBLICATIONS

Japanese Patent Office, International Search Report issued in corresponding International Patent Application No. PCT/JP2013/061278 and English-language translation, dated Jul. 16, 2013 (4 pages).

(Continued)

Primary Examiner — Bickey Dhakal
Assistant Examiner — Charles S Laughlin
(74) Attorney, Agent, or Firm — Wood Herron & Evans LLP

(57) ABSTRACT

The motor control device is an electric motor control device including a control unit (control circuit unit) configured to output a forward-rotation command or a reverse-rotation command to the electric motor. The control unit includes a position detector (door opening/closing information generation circuit) configured to detect a rotation direction of the electric motor when a detection signal is input from a rotation sensor (Hall integrated circuit (IC)), which detects the rotation of the electric motor, while no current is supplied to the electric motor. The control unit includes an (Continued)

electric current supply device (pulse width modulation (PWM) command generation circuit) configured to supply an electric current by which the electric motor is rotated in an opposite direction to the detected rotation direction by increasing an electric current supply duty ratio every time the detection signal is switched.

5 Claims, 8 Drawing Sheets

(51) Int. Cl.
    *H02P 6/24*     (2006.01)
    *H02P 6/08*     (2016.01)
    *E05F 15/646*     (2015.01)
    *E05F 15/70*     (2015.01)
    *H02P 6/30*     (2016.01)
    *B60J 5/06*     (2006.01)
    *E05D 15/10*     (2006.01)

(52) U.S. Cl.
    CPC .................. *H02P 6/24* (2013.01); *H02P 6/30* (2016.02); *B60J 5/06* (2013.01); *E05D 15/1044* (2013.01); *E05D 2015/1055* (2013.01); *E05Y 2201/438* (2013.01); *E05Y 2201/672* (2013.01); *E05Y 2400/302* (2013.01); *E05Y 2400/326* (2013.01); *E05Y 2400/36* (2013.01); *E05Y 2400/44* (2013.01); *E05Y 2800/00* (2013.01); *E05Y 2800/74* (2013.01); *E05Y 2900/50* (2013.01); *E05Y 2900/531* (2013.01)

(56) References Cited

U.S. PATENT DOCUMENTS

| | | | | |
|---|---|---|---|---|
| 2001/0024093 | A1* | 9/2001 | Naganuma | H02H 7/0851 |
| | | | | 318/445 |
| 2012/0000304 | A1* | 1/2012 | Hamminga | E05F 15/622 |
| | | | | 74/89.23 |
| 2012/0061977 | A1* | 3/2012 | Takeda | E05B 81/20 |
| | | | | 292/201 |

FOREIGN PATENT DOCUMENTS

| | | |
|---|---|---|
| JP | 2002188361 A | 7/2002 |
| JP | 2002194947 A | 7/2002 |
| JP | 2007023585 A | 2/2007 |
| JP | 2008005656 A | 1/2008 |
| JP | 2011139573 A | 7/2011 |

OTHER PUBLICATIONS

Practical Crane Electrical Technical Manual.
Chinese Patent Office, Decision of Rejection issued in Chinese Patent Application No. 201380020156.X dated May 3, 2018, 8 pages.

* cited by examiner

FIG. 4B

FORWARD DIRECTION ROTATION (FORWARD ROTATION)

| ROTOR POSITION SEQUENCE Sn | POSITION SIGNAL PATTERN | ELECTRIC CURRENT APPLICATION PATTERN |
|---|---|---|
| S1 | A | G |
| S2 | B | H |
| S3 | C | I |
| S4 | D | J |
| S5 | E | K |
| S6 | F | L |
| S1 | A | G |

FIG. 4C

REVERSE DIRECTION ROTATION (REVERSE ROTATION)

| ROTOR POSITION SEQUENCE Sn | POSITION SIGNAL PATTERN | ELECTRIC CURRENT APPLICATION PATTERN |
|---|---|---|
| S1 | A | G |
| S6 | F | L |
| S5 | E | K |
| S4 | D | J |
| S3 | C | I |
| S2 | B | H |
| S1 | A | G |

MOTOR CONTROL DEVICE

TECHNICAL FIELD

The present invention relates to a motor control device for operating an electric motor for driving a driven body.

Priority is claimed on Japanese Patent Application No. 2012-094924, filed Apr. 18, 2012, and Japanese Patent Application No. 2012-260120, filed Nov. 28, 2012, the contents of which are incorporated herein by reference.

BACKGROUND ART

In motor control devices for driving a driven body such as a slide door or a back door provided on a vehicle using an electric motor, the door is configured to operate in both opening and closing directions by controlling a rotation of the electric motor in the forward and reverse directions. Such a motor control device, for example, is disclosed in Patent Literature 1.

CITATION LIST

Patent Literature

[Patent Literature 1]
Japanese Unexamined Patent Application, First Publication No. 2007-23585

SUMMARY OF INVENTION

Technical Problem

However, in the motor control device disclosed in Patent Literature 1, for example, a configuration having a tilt sensor is adopted to detect a tilt of an opening/closing direction of the slide door when a vehicle is parked on an uneven sloping ground. Because of this, there is a problem in that a circuit scale increases due to an additional step of processing an output signal of a tilt sensor in a control unit in the motor control device and that a response to control of the electric motor is delayed due to an increase in processing time.

An objective of the present invention is to provide a motor control device capable of performing a control process of stopping movement of a slide door, for example, on sloping ground, or the like, according to regenerative braking and rotary driving of an electric motor without using a tilt sensor.

Solution to Problem

According to a first aspect of the present invention, a motor control device includes a control unit configured to output a forward-rotation command or a reverse-rotation command of an electric motor to the electric motor. The control unit includes a position detector configured to detect a rotation direction of the electric motor when a detection signal is input from a rotation sensor, which detects the rotation of the electric motor, while no current is supplied to the electric motor, and an electric current supply device configured to supply an electric current by which the electric motor is rotated in an opposite direction to the detected rotation direction by increasing an electric current supply duty ratio every time the detection signal is switched.

According to a second aspect of the present invention, in the motor control device, the control unit causes the electric motor to generate an electric braking force in a rotation stop state of the electric motor.

According to a third aspect of the present invention, in the motor control device, the control unit further includes a carrier frequency switcher. When the rotation of the electric motor is detected while no electric current is supplied to the electric motor, the control unit controls a carrier frequency of electric current supply at which the motor rotates to be decreased by the carrier frequency switcher.

Effects of Invention

According to the above-described motor control device, a slide door is stopped by regenerative braking of an electric motor. Although a slide door is moved in an opening or closing direction due to gravity when the slide door is on sloping ground, the control unit stops the slide door by rotating and driving the electric motor in an opposite direction to a moving direction due to gravity. Thereby, it is possible to provide a motor control device capable of performing a control process of stopping the movement of a slide door, for example, on sloping ground, or the like, through a rotation sensor, position detector, and electric current supply device without using a tilt sensor.

BRIEF DESCRIPTION OF DRAWINGS

FIG. 4B is an explanatory diagram illustrating a relationship among a rotor position sequence Sn, a direction signal D (position signal pattern), and an electric current supply pattern for the electric motor 21 when the motor control device 41 of the opening/closing device 14 drives the electric motor 21 in the forward direction.

FIG. 4C is an explanatory diagram illustrating a relationship among a rotor position sequence Sn, a direction signal D (position signal pattern), and an electric current supply pattern for the electric motor 21 when the motor control device 41 of the opening/closing device 14 drives the electric motor 21 in a reverse direction.

DESCRIPTION OF EMBODIMENTS

Figure 1:
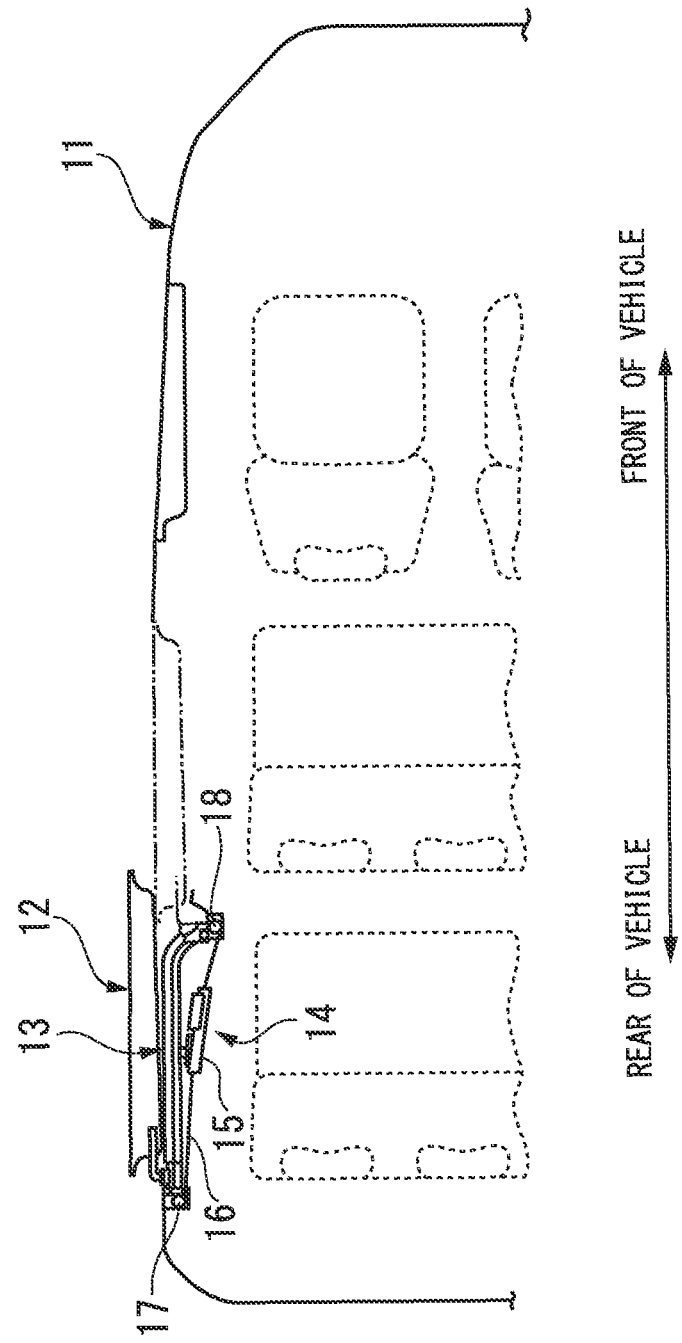
FIG. 1 is a plan view schematically illustrating an opening/closing device 14 equipped with a motor control device 41 as an embodiment of the present invention.

FIG. 1 is a plan view schematically illustrating an opening/closing device 14 equipped with a motor control device 41 as an embodiment of the present invention. As illustrated in FIG. 1, a slide door 12 serving as a driven body is mounted on a side portion of a vehicle 11. The slide door 12 is guided to a guide rail 13 fixed to the vehicle 11, and is movable, that is, freely openable/closable, in a front or rear direction of the vehicle between a fully open position indicated by a solid line and a fully closed position indicated by a dashed line in the drawing.

The slide door opening/closing device 14 (hereinafter referred to as the opening/closing device 14) is provided on the vehicle 11. The opening/closing device 14 automatically opens/closes the slide door 12. This opening/closing device 14 has a driving unit 15 fixed to the vehicle 11. A driving cable 16 is provided on the driving unit 15. The cable 16 is stretched along reversing pulleys 17 and 18 disposed on both ends of the guide rail 13, and connected from the front and rear sides of the vehicle 11 to the slide door 12. When either one side of the cable 16 is pulled by the driving unit 15, the slide door 12 moves in an opening or closing direction while being pulled by the cable 16.

Figure 2:
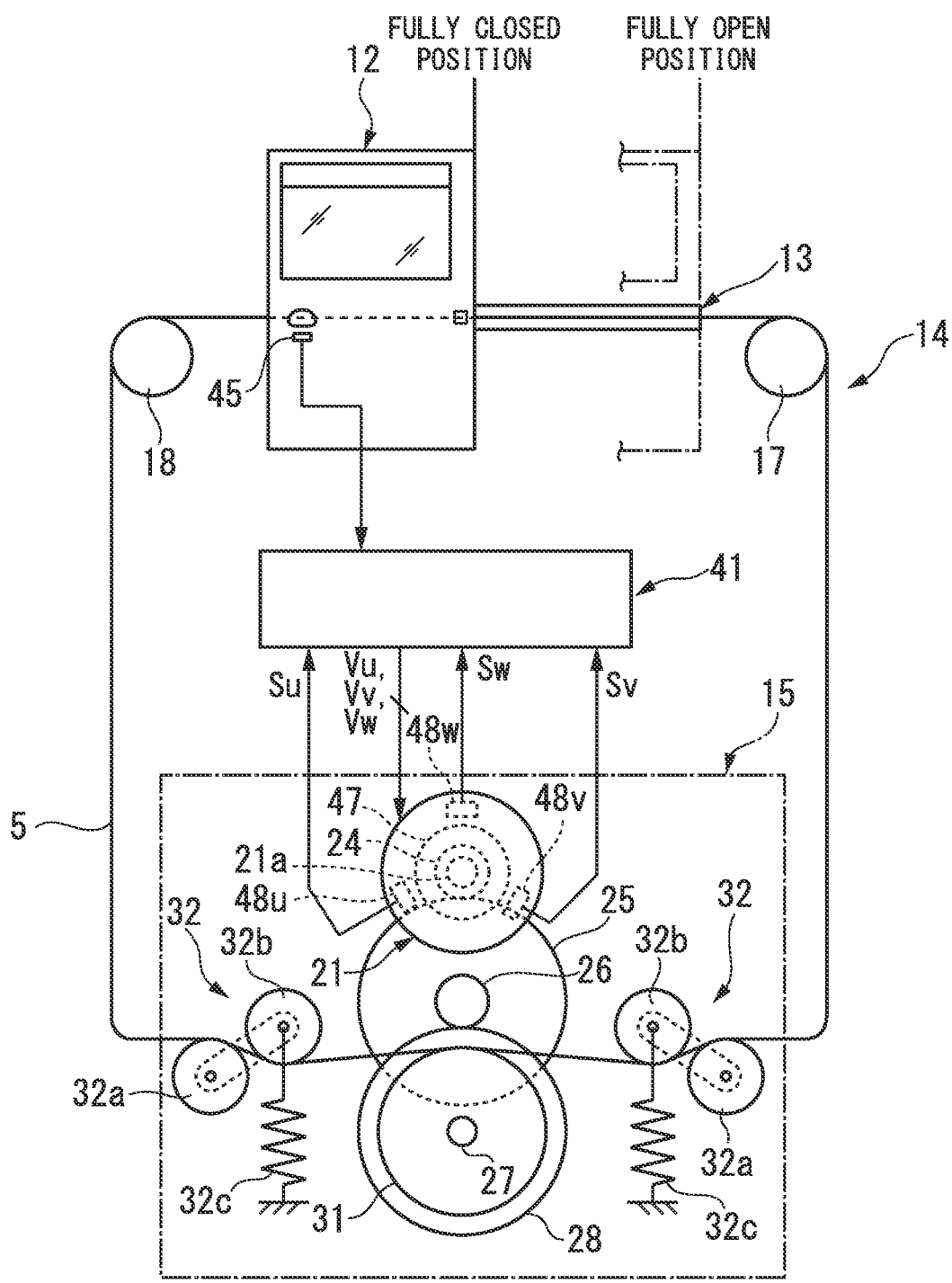
FIG. 2 is an explanatory diagram illustrating a control system of the opening/closing device 14 illustrated in FIG. 1.
Figure 3:
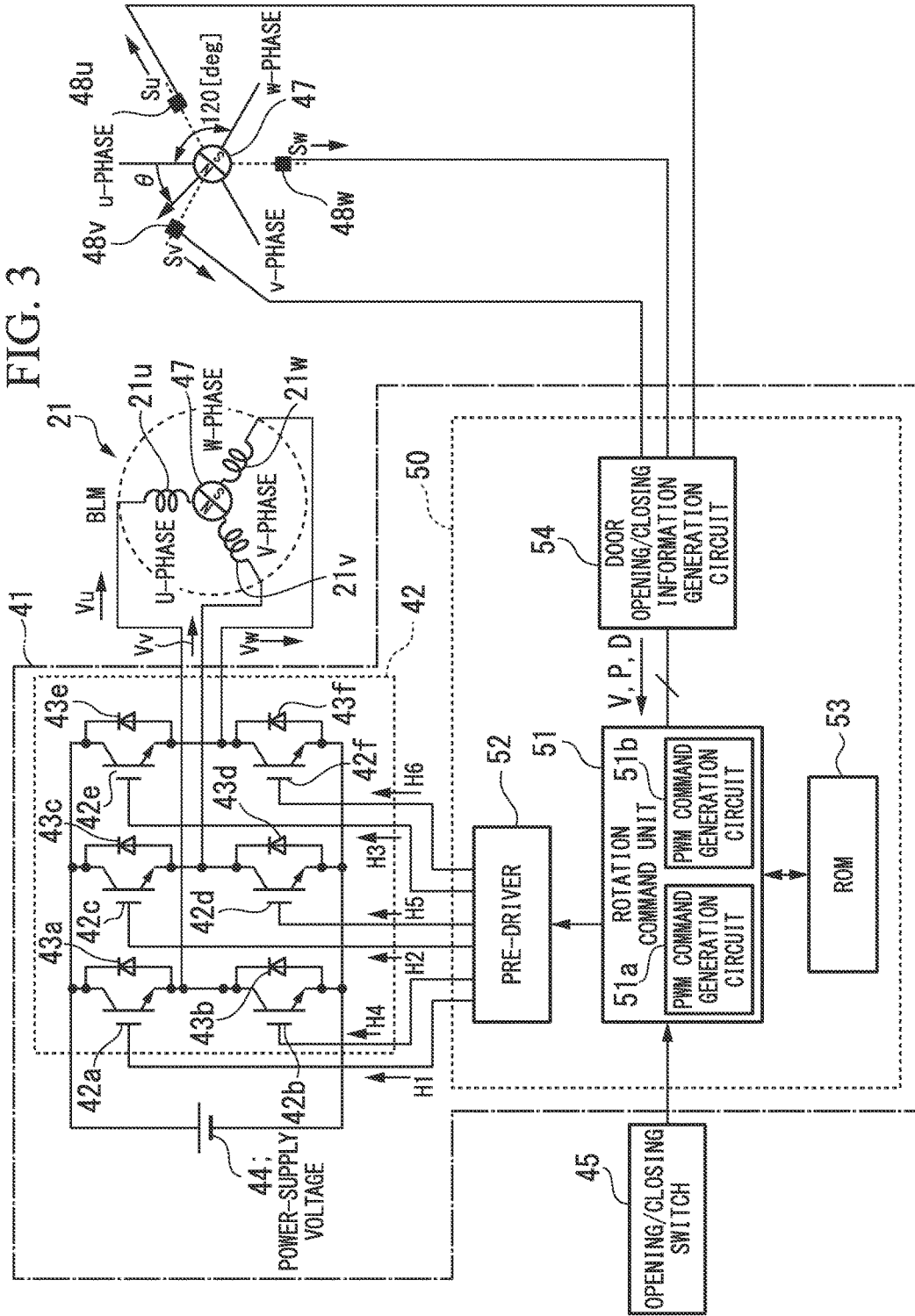
FIG. 3 is a circuit diagram illustrating details of the motor control device 41 and an electric motor 21 illustrated in FIG. 2.

FIG. 2 is an explanatory diagram illustrating a control system of the opening/closing device 14 illustrated in FIG. 1. In addition, FIG. 3 is a circuit diagram illustrating details of the motor control device 41 illustrated in FIG. 2.

As illustrated in FIG. 2, the electric motor 21 is provided on a driving unit 15. In this embodiment, a brushless motor (hereinafter also referred to as a "BLM") of three phases (U-phase, V-phase, and W-phase) is used as the electric motor 21. The electric motor 21 operates when voltages Vu, Vv, and Vw are applied from the motor control device 41 for the three phases according to an electric current supply pattern. The electric motor 21 switches its rotation direction to the forward or the reverse rotation according to a positive/negative polarity of an applied voltage to be supplied. In addition, a rotor 47 (permanent magnet) is fixed to a rotation shaft 21a of the electric motor 21. In the vicinity of a rotation track of the rotor 47, three Hall integrated circuits (ICs) 48u, 48v, and 48w are provided at positions 120 degrees from one another around a rotation shaft 21a. These three Hall ICs 48u, 48v, and 48w output the pulse signals Su, Sv, and Sw each shifted 120 degrees from one another to the motor control device 41 when the rotation shaft 21a of the electric motor 21 rotates.

In addition, a driving gear 24 is fixed to the rotation shaft 21a of the electric motor 21. A large-diameter spur gear 25 is engaged with the driving gear 24. A driven gear 28 fixed to an output shaft 27 is engaged with a small-diameter spur gear 26 which rotates integrally with the large-diameter spur gear 25. Thereby, the rotation of the electric motor 21 is decelerated at a predetermined deceleration rate and transferred to the output shaft 27.

A cylindrical drum 31 having an outer circumferential surface on which a spiral guide groove (not illustrated) is formed is fixed to the output shaft 27. The cable 16 guided to the driving unit 15 on the drum 31 is wound along the guide groove a plurality of times. When the electric motor 21 operates, the drum 31 is driven and rotated by the electric motor 21 and therefore the cable 16 operates the slide door 12 to perform an opening/closing operation. That is, when the electric motor 21 rotates in a forward direction (which is set as a clockwise direction in FIG. 2), the drum 31 rotates in a counterclockwise direction in FIG. 2. Thereby, the cable 16 of the rear side of the vehicle is wound on the drum 31 and the slide door 12 moves in the opening direction while being pulled by the cable 16. In contrast, when the electric motor 21 rotates in a reverse direction (which is set as a counterclockwise direction in FIG. 2), the drum 31 rotates in the clockwise direction in FIG. 2. Thereby, the cable 16 of the front side of the vehicle is wound on the drum 31 and the slide door 12 moves in the closing direction while being pulled by the cable 16. Thereby, the slide door 12 is connected to the electric motor 21 via the cable 16, the drum 31, the output shaft 27, etc., and is configured so that the opening/closing of the slide door 12 is driven by the electric motor 21.

Also, in this embodiment, the driving unit 15 is of a clutchless type in which a clutch mechanism is not provided between the electric motor 21 and the output shaft 27. That is, a state in which power can be constantly transferred from the electric motor 21 to the output shaft 27, that is, the slide door 12, is provided.

Tensioners 32 are provided between the drum 31 and two reversing pulleys 17 and 18. The tensioners 32 maintain the cable tension in a constant range by eliminating the loosening of the cable 16 between the drum 31 and the slide door 12. Each tensioner 32 has a fixed pulley 32a and a movable pulley 32b. The movable pulley 32b is biased by a spring member 32c in the rotation direction using the fixed pulley 32a as an axis center, and the cable 16 is stretched between the pulleys 32a and 32b. Accordingly, when the cable 16 is loosened, the cable 16 is biased by the movable pulley 32b, a movement path of the cable 16 is increased, and therefore the tension of the cable 16 is maintained.

The motor control device 41 is provided in the driving unit 15. The motor control device 41 controls the operation of the electric motor 21 so as to move the slide door 12 at a preset target speed (hereinafter referred to as a target speed Vc) in the opening/closing direction.

FIG. 3 is a circuit diagram illustrating details of the motor control device 41 and the electric motor 21 illustrated in FIG. 2.

The electric motor 21 is a three-phase direct current (DC) brushless motor (BLM). The electric motor 21 includes a rotor 47 (magnet rotor) configured by embedding a permanent magnet including one pair of N and S poles in an inner rotor type. In addition, the electric motor 21 includes stator wires 21u, 21v, and 21w (armature wires) of U-phase, V-phase, and W-phase connected by a start connection to be controlled in an electric current supply section of an electric current of an electric angle of 120 degrees.

In addition, in the vicinity of the rotor 47, a rotation position detection elements (Hall ICs 48u, 48v, and 48w) are disposed at every 120 degrees. These Hall ICs detect the rotation position of the rotor 47.

The motor control device 41 for controlling the electric motor 21 is configured to include a driving circuit unit 42, a power-supply voltage (hereinafter referred to as a DC power supply 44), and a control circuit unit 50.

The driving circuit unit 42 is configured to include insulated gate bipolar transistors (IGBTs) 42a to 42f serving as six switching elements connected in a three-phase bridge form and flywheel diodes 43a to 43f connected in inverse parallel between collectors and emitters of the transistors 42a to 42f. Gates of the transistors 42a to 42f connected in a bridge connection are connected to the control circuit unit 50. In addition, the collectors or the emitters of the six transistors 42a to 42f are connected to the stator wires 21u, 21v, and 21w connected in the star connection. Thereby, the six transistors 42a to 42f perform switching operations through driving signals H1 to H6 input from the control circuit unit 50, and supplies stator wires U, V, and W with a power-supply voltage of the DC power supply 44 applied to the driving circuit unit 42 as the applied voltages Vu, Vv, and Vw of the three phases (U-phase, V-phase, and W-phase).

The control circuit unit 50 forms the driving signals H1 to H6 for driving the gates of the transistors 42a to 42f of the driving circuit unit 42 as pulse width modulation (PWM) signals so as to perform the variable control of the applied voltages Vu, Vv, and Vw for the electric motor 21. The control circuit unit 50 controls the applied voltages to be supplied from the DC power supply 44 to the armature wires U, V, and W by switching the transistors 42a to 42f at a high speed.

The control circuit unit 50 is configured to include a rotation command unit 51, a pre-driver 52, a read only memory (ROM) 53, and a door opening/closing information generation circuit 54.

The rotation command unit 51 outputs a PWM command signal (a forward-rotation command or a reverse-rotation command) for rotating and driving the electric motor 21 in the forward or reverse direction to the pre-driver 52 according to a speed signal V, a position signal P, and a direction signal D (a position signal pattern to be described later) input from the door opening/closing information generation circuit 54. The pre-driver 52 forms the driving signals H1 to H6 for alternately switching the transistors 42a to 42f to output the formed driving signals H1 to H6 based on the input PWM command signal, and outputs the formed driving signals H1 to H6 to the driving circuit unit 42. Thereby, the driving circuit unit 42 applies the electric current supply patterns of the supplied voltages Vu, Vv, and Vw for alternately supplying the electric currents to the stator wires 21u, 21v, and 21w to the stator wires, and causes the rotor 47 to be rotated in a rotation direction indicated by the rotation command unit 51.

The rotation command unit 51 includes a PWM command generation circuit 51a and a PWM command generation circuit 51b.

The PWM command generation circuit 51a is connected to the opening/closing switch 45. When an operator operates the opening/closing switch 45 and a door opening/closing start command signal is input to the rotation command unit 51, the PWM command generation circuit 51a generates a PWM command signal according to the speed signal V, the position signal P, and the direction signal D input from the door opening/closing information generation circuit 54, and outputs the generated PWM command signal to the pre-driver 52. The calculation of a duty (a ratio for a cycle of an ON period of a driving signal output by the pre-driver 52) by the PWM command generation circuit 51a is executed as follows. That is, the PWM command generation circuit 51a calculates the duty according to the proportional control and the integral control based on the movement speed (the speed of the speed signal V) of the slide door 12 and the target speed Vc preset in the experiment or the design and stored within the ROM 53. The PWM command generation circuit 51a calculates $x = k_p(V-V_c) + k_i \Sigma(V-V_c)$ through proportional integration (PI) calculation based on the movement speed V and the target speed Vc of the slide door 12 for duties of the driving signals H1 to H6. That is, the PWM command generation circuit 51a calculates the output x by referring to a duty setting control map (not illustrated) stored within the ROM 53. Here, kp represents a proportional gain and ki represents an integral gain. According to this PI control, stable speed control is possible because the output x does not become 0 even when a difference between the movement speed V and the target speed Vc becomes 0 according to accumulation of a difference between the movement speed V of the slide door 12 and the target speed Vc.

The PWM command generation circuit 51a outputs the PWM command signal in the same direction as the rotation direction represented by the direction signal D to the pre-driver 52. Also, the control map of the ROM 53 stores the target speed Vc in association with the position of the slide door 12 represented by the position signal P and the movement direction of the slide door 12 represented by the direction signal D.

The PWM command generation circuit 51b is connected to the opening/closing switch 45. When the operator inputs a door opening/closing stop command signal to the opening/closing switch 45, the PWM command generation circuit 51b generates a PWM command signal according to the direction signal D input from the door opening/closing information generation circuit 54, and outputs the generated PWM command signal to the pre-driver 52. At this time, the PWM command generation circuit 51b determines whether there is a change in the number of pulses of the direction signal D in a preset predetermined range, and outputs a PWM command signal of an opposite direction to the rotation direction represented by the direction signal D to the pre-driver 52 according to a determination result. In addition, the PWM command generation circuit 51b reads an initial value of the duty of the driving signal output by the pre-driver 52 and a step value which is its increment amount from the ROM 53. The PWM command generation circuit 51b outputs the PWM command signal of the duty generated by incrementing the initial value by a step value to the pre-driver 52 according to an increase in the number of pulses of the direction signal D. The PWM command generation circuit 51b increments the duty until there is no change in the number of pulses of the direction signal D. When there is no change in the number of pulses, the PWM command generation circuit 51b continuously outputs the PWM command signal fixed at the duty at that time until there is a new input to the opening/closing switch 45.

The ROM 53 stores a predetermined determination period and a determination threshold value (the number of pulses) when the number of pulses of the direction signal D is changed, an initial value when the duty is changed, and a step value in association with the rotation direction represented by the direction signal D.

The door opening/closing information generation circuit 54 generates the speed signal V, the position signal P, and the direction signal D (position signal pattern) to be used by the rotation command unit 51 to generate the PWM command signal from the pulse signals Su, Sv, and Sw which are output by the Hall ICs 48u, 48v, and 48w, respectively.

When the pulse signals Su, Sv, and Sw output by the Hall ICs 48u, 48v, and 48w, respectively, are input, the door opening/closing information generation circuit 54 calculates the rotation speed of the electric motor 21, that is, the movement speed V of the slide door 12, based on a pulse signal generation interval. In addition, the door opening/closing information generation circuit 54 detects the rotation direction of the electric motor 21, that is, the movement direction of the slide door 12, based on an appearing timing (appearing order) of the pulse signals Su, Sv, and Sw, and outputs the direction signal D. In addition, the door opening/closing information generation circuit 54 detects the position of the slide door 12 by counting (integrating) the switching of the pulse signal using a point in time at which the slide door 12 is at a reference position (for example, a fully closed position) as a starting point, and outputs the position signal P.

Figure 4A:
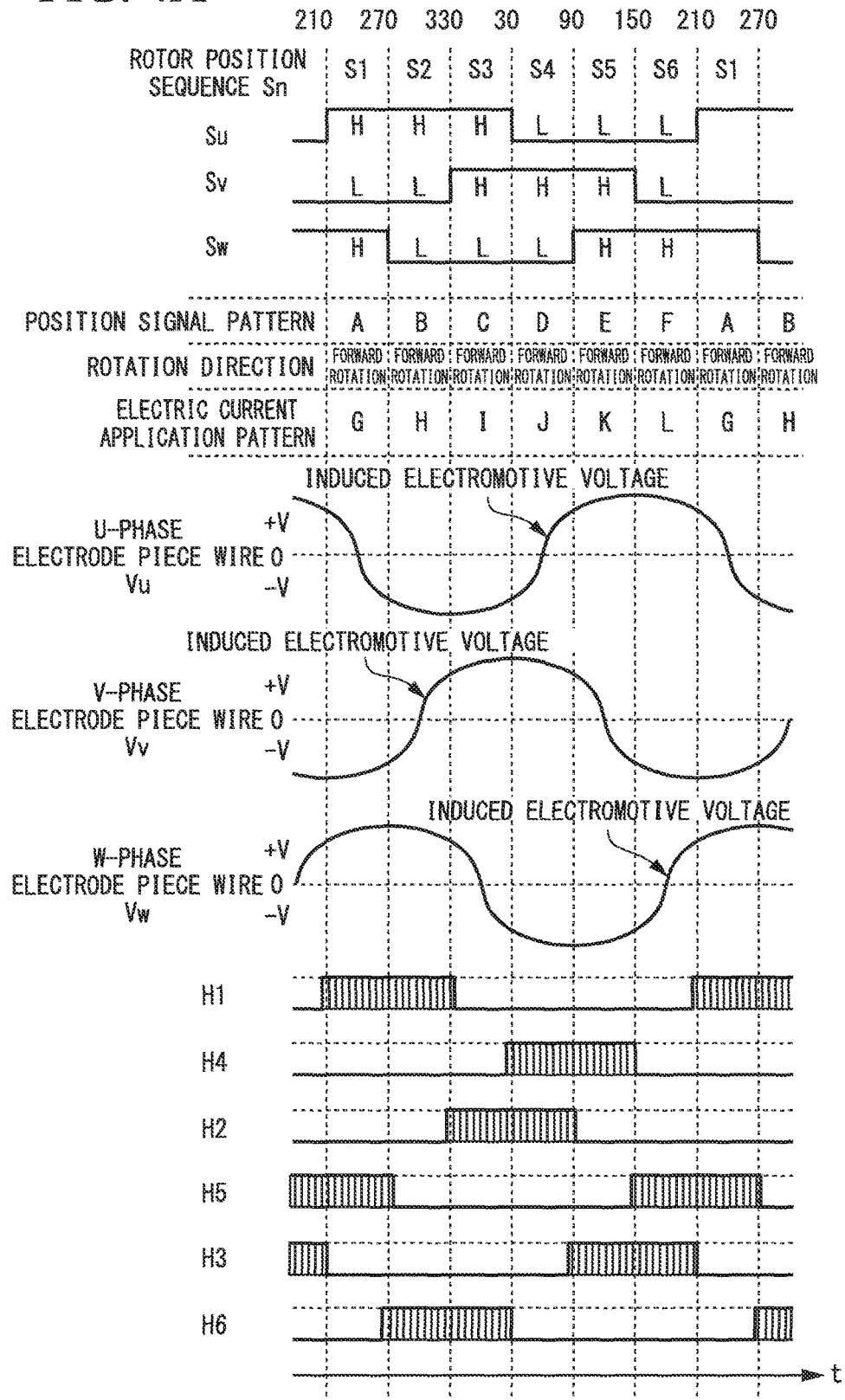
FIG. 4A is an operation time chart of elements when the motor control device 41 of the opening/closing device 14 drives the electric motor 21 in a forward direction.

FIGS. 4A to 4C are time charts illustrating signals of elements in a control system of the opening/closing device 14.

FIG. 4A is an operation time chart of elements when the motor control device 41 illustrated in FIG. 3 rotates and drives the electric motor 21 in the forward direction. In addition, each of FIGS. 4B and 4C illustrates a relationship among a rotor position sequence Sn, a direction signal D (position signal pattern), and an electric current supply pattern for the electric motor 21 when the electric motor 21 is driven in the forward or reverse direction.

In the operation of rotating and driving the electric motor 21 in the forward direction, the Hall ICs 48$u$, 48$v$, and 48$w$ output the high (H) or low (L) signals as illustrated in FIG. 4A as the pulse signals Su, Sv, and Sw. The door opening/closing information generation circuit 54 detects the rotation direction of the rotor 47 from the above-described signals, and outputs the detected rotation direction as the direction signal D (position signal pattern) to the rotation command unit 51. For example, when the rotor 47 is at a rotation position of S1 of the rotator position sequence Sn, the pulse signals Su, Sv, and Sw become the H signal, the L signal, and the H signal, respectively.

That is, because the detection is performed by the three Hall ICs, the position signal pattern becomes H-L-H (representing a signal obtained by arranging the pulse signals Su, Sv, and Sw in parallel), and this position signal pattern is set as a position signal pattern "A" for convenience. In addition, when the rotor position sequence Sn is S2, the position signal pattern becomes H-L-L and the position signal pattern becomes "B."

That is, the direction signal D (position signal pattern) output by the door opening/closing information generation circuit 54 becomes "A" to "F" in correspondence with the rotor position sequences 51 to S6 in which the rotor position is rotated 360 degrees. In this manner, when the rotor 47 of the electric motor 21 is driven in the forward-rotation direction which is a set direction from the opening/closing switch 45, the door opening/closing information generation circuit 54 outputs the direction signal D (position signal patterns A to F) to the rotation command unit 51 in correspondence with the sequences S1 to S6 of the rotor position sequences Sn.

On the other hand, the PWM command generation circuit 51$a$ in the rotation command unit 51 outputs a PWM command signal for rotating the electric motor 21 in the forward direction based on the direction signal D of the door opening/closing information generation circuit 54 to the pre-driver 52. Based on the PWM command signal, the pre-driver 52 outputs the driving signals H1 to H6 which are the PWM signals for driving the gates of the transistors 42$a$ to 42$f$ of the driving circuit unit 42. The driving signals H1 to H6 are illustrated in FIG. 4A. Also, in FIG. 4A, a hatched portion represents that the transistors 42$a$ to 42$f$ are turned on/off through the PWM control.

The driving circuit unit 42 controls switching of the transistors 42$a$ to 42$f$ through the driving signals H1 to H6, and applies the applied voltages Vu, Vv, and Vw as illustrated in FIG. 4A to the stator wires 21$u$, 21$v$, and 21$w$. Thereby, the rotor 47 of the electric motor 21 rotates in the forward direction. In this embodiment, as illustrated in FIGS. 4A to 4C, the electric current supply patterns of the applied voltages Vu, Vv, and Vw are set as the electric current supply patterns G to L in correspondence with the above-described direction signal D (position signal patterns A to F) for convenience. For example, the driving circuit unit 42 outputs the electric current supply pattern G of (0)–(−V)–(+V) in correspondence with the position signal pattern A.

In this manner, the PWM command signal for driving the electric motor 21 in the forward direction is input from the rotation command unit 51 and the pre-driver 52 outputs the driving signals H1 to H6 for driving the transistors 42$a$ to 42$f$ as the PWM signals. In addition, in the pre-driver 52, the pulse width (duty) of the PWM signal is adjusted by the rotation command unit 51 according to the target speed Vp. Thereby, the applied voltages Vu, Vv, and Vw of the electric motor 21 are controlled by variable control and the rotation speed of the rotation shaft 21$a$ of the electric motor 21 is adjusted.

As described with reference to FIG. 4A, the pulse signals Su, Sv, and Sw output by the Hall ICs 48$u$, 48$v$, and 48$w$ in correspondence with the rotation positions S1 to S6 of the rotor 47 are of six types. In addition, the direction signal D serving as an output signal of the door opening/closing information generation circuit 54, that is, the position signal pattern, is of six types of the position signal patterns A to F. Thereby, the driving signals H1 to H6 output by the pre-driver 52 have six types of patterns, and consequently serve as six types of the electric current supply patterns G to L for armature wires U, V, and W of phases. This relationship is summarized as a time table and illustrated in FIGS. 4B and 4C.

FIG. 4B illustrates a relationship of the rotor position sequences S1 to S6, the position signal patterns A to F, and the electric current supply patterns G to L prescribed at the time of the forward rotation of the electric motor 21.

For the order of S1 to S6 (which means the order of S1→S2→S3→S4→S5→S6) of the rotor position sequences Sn during the forward rotation, the order of position signal pattern becomes A to F (which means the order of A→B→C→D→E→F). In addition, the order of electric current supply pattern output based on the position signal pattern becomes G to L (which means the order of G→H→I→J→K→L).

Likewise, as illustrated in FIG. 4C, for the order of S6 to S1 (which means the order of S6→S5→S4→S3→S2→S1) of the rotor position sequences Sn during the reverse rotation, the order of the position signal pattern becomes F to A (which means the order of F→E→D→C→B→A). In addition, the order of electric current supply pattern output based on the position signal pattern becomes L to G (which means the order of L→K→J→I→H→G).

As described above, in the motor control device 41, it is possible to rotate the electric motor 21 in two directions of the forward and the reverse rotations by changing duties during the ON periods of the transistors 42$a$ to 42$f$ of the driving circuit unit 42 and superimposing the ON periods of the transistors 42$a$ to 42$f$ in a predetermined combination. Thereby, when a crew or the like instructs to open/close the slide door 12 by operating the opening/closing switch 45, the motor control device 41 operates to open (door OPEN) or close (door CLOSE) the slide door 12 automatically and at the target speed Vp.

In addition, when the crew or the like instructs to stop the slide door 12 during the opening/closing of the slide door 12 by operating the opening/closing switch 45, so-called regenerative braking occurs in the electric motor 21 and stops the electric motor 21. This operation is performed as the rotation command unit 51 outputs the PWM command signal in which the driving signals H1 to H3 (or the driving signals H4 to H6) have a duty of 100% to the pre-driver 52 and the driving circuit unit 42 short-circuits the stator wires 21$u$, 21$v$, and 21$w$ by turning on corresponding IGBTs.

Incidentally, it is preferable to cause regenerative braking in the electric motor 21 and stop the slide door 12 when the crew or the like instructs to stop the slide door 12 during the opening/closing of the slide door 12 by operating the opening/closing switch 45. However, when the opening/closing of the slide door 12 is stopped midway as in the case in which the vehicle 11 is parked on the uneven sloping ground such as a sloping road, gravity affects the slide door 12 and the slide door 12 moves in the direction in which gravity acts. In order to stop the slide door 12 even in this case, this embodiment includes the PWM command generation circuit 51b in the rotation command unit 51. This PWM command generation circuit 51b determines whether the vehicle 11 is in a flat place, and stops the slide door 12 by applying a force to the slide door 12 via the electric motor 21 in an opposite direction to a movement direction of the slide door 12, that is, the direction in which gravity acts, when the vehicle 11 is not in the flat place. Hereinafter, a control procedure (door holding process) of stopping the slide door 12 will be described using FIG. 5.

Figure 5:
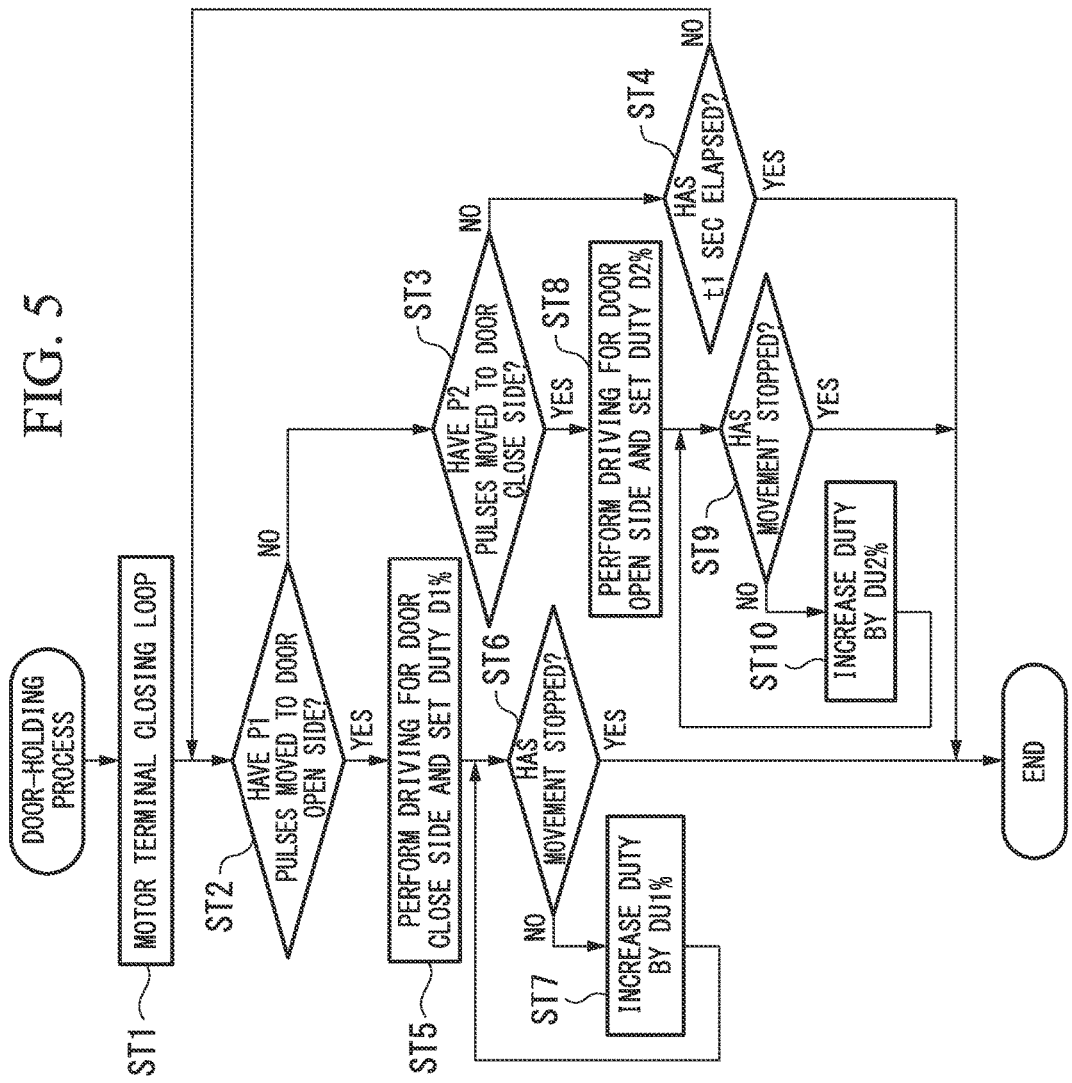
FIG. 5 is a flowchart diagram illustrating a control procedure of stopping a slide door 12.

FIG. 5 is a flowchart diagram illustrating the control procedure of stopping the slide door 12.

First, the crew or the like instructs to stop the slide door 12 during opening/closing of the slide door 12 by operating the opening/closing switch 45 (step ST1).

The PWM command generation circuit 51b of the rotation command unit 51 outputs a PWM command signal in which the driving signals H1 to H3 (or the driving signals H4 to H6) have a duty of 100% to the pre-driver 52. The pre-driver 52 turns on the IGBTs 42a, 42c, and 42e (or 42b, 42d, and 42θ of the driving circuit unit 42 and short-circuits the stator wires 21u, 21v, and 21w. The electric motor 21 transitions to the rotation stop state and regenerative braking occurs and operates to stop the slide door 12 by applying an electric braking force to the slide door 12.

The PWM command generation circuit 51b determines whether the slide door 12 moves to a door OPEN side and whether the slide door 12 moves to a door CLOSE side within time t1 (steps ST2 to ST4).

First, the PWM command generation circuit 51b determines whether the slide door 12 moves to the door OPEN side. The PWM command generation circuit 51b makes this determination by comparing the number of pulses of the direction signal D (position signal pattern) input from the door opening/closing information generation circuit 54 to a determination threshold value (the number P1 of pulses) stored in the ROM 53 (step ST2). That is, when the slide door 12 moves to the OPEN side, gravity acting on the slide door 12 is transferred to the rotation shaft 21a of the electric motor 21 via the cable 16, the drum 31, the output shaft 27, the driven gear 28, the small-diameter spur gear 26, the large-diameter spur gear 25, and the driving gear 24, and the rotation shaft 21a rotates in the forward-rotation direction. According to the rotation of the forward-rotation direction of the rotation shaft 21a, the door opening/closing information generation circuit 54 outputs a direction signal D similar to that when the electric motor 21 is rotated and driven in the forward direction (see FIG. 4B). The PWM command generation circuit 51b counts the direction signal D and determines that the slide door 12 moves to the OPEN side because the vehicle 11 is parked upward when the counted number of pulses is greater than or equal to the number P1 of pulses (step ST2: Yes). On the other hand, the PWM command generation circuit 51b determines that the slide door 12 does not move to the OPEN side when the counted number of pulses is less than the number P1 of pulses (step ST2: No).

Upon determining that the slide door 12 moves to the OPEN side, the PWM command generation circuit 51b generates a PWM command signal so that the electric motor 21 rotates in a reverse-rotation direction, that is, so that the pre-driver 52 outputs the driving signals H1 to H6 (PWM signals). Because of this, the PWM command generation circuit 51b reads an initial value D1 of the duty of the driving signal output by the pre-driver 52 and a step value Du1 which is its increment amount from the ROM 53. The PWM command generation circuit 51b outputs the PWM command signal generated based on the initial value D1 to the pre-driver 52. The pre-driver 52 drives the transistors 42a to 42f of the driving circuit unit 42 according to the driving signals H1 to H6 (PWM signals) based on the input PWM command signal. The driving circuit unit 42 performs a switching operation according to the driving signals H1 to H6 input from the pre-driver 52, and supplies the stator wires U, V, and W with a power-supply voltage of the DC power supply 44 applied to the driving circuit unit 42 as the applied voltages Vu, Vv, and Vw (step ST5). At this time, the electric current supply pattern is an electric current supply pattern (see FIG. 4C) for rotating the electric motor 21 in the reverse-rotation direction.

The PWM command generation circuit 51b determines whether the slide door 12 has stopped (step ST6). The PWM command generation circuit 51b makes this determination by counting the number of pulses of the direction signal D (position signal pattern) input from the door opening/closing information generation circuit 54 and determining whether a count number increases. That is, the determination is made according to whether the number of pulses of the position signal D (the position signal pattern illustrated in FIG. 4B) of the forward-rotation direction increases. When the counted number of pulses does not increase, the PWM command generation circuit 51b determines that the slide door 12 has stopped (step ST6: Yes). Thereby, a door holding process ends, and the electric motor 21 maintains the rotation state of the reverse-rotation direction and maintains a stop state of the slide door 12.

On the other hand, when the counted number of pulses increases, the PWM command generation circuit 51b generates the PWM command signal so as to increase a rotation force in the reverse-rotation direction of the electric motor 21, that is, so that the pre-driver 52 outputs the driving signals H1 to H6 (PWM signals). The PWM command generation circuit 51b generates the PWM command signal by adding the step value Du1 to the initial value D1 every time as the number of pulses increases, and outputs the generated PWM command signal to the pre-driver 52. The pre-driver 52 drives the transistors 42a to 42f of the driving circuit unit 42 according to a PWM signal in which the duty has increased based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST7). At this time, the electric current supply pattern is an electric current supply pattern (see FIG. 4C) for rotating the electric motor 21 in the reverse-rotation direction. Until it is determined that the slide door 12 has stopped in the above-described step ST6, an operation of increasing the duty of the PWM signal is iterated and the rotation force in the reverse-rotation direction of the electric motor 21 is increased.

On the other hand, upon determining that the slide door 12 does not move to the OPEN side (step ST2: No), the PWM command generation circuit 51b determines whether the slide door 12 moves to the door CLOSE side. The PWM command generation circuit 51b makes this determination by comparing the number of pulses of the direction signal D (position signal pattern) input from the door opening/closing information generation circuit 54 to a determination threshold value (the number P2 of pulses) stored in the ROM 53

(step ST3). That is, when the slide door 12 moves to the CLOSE side, gravity acting on the slide door 12 is transferred to the rotation shaft 21a of the electric motor 21 via the cable 16, the drum 31, the output shaft 27, the driven gear 28, the small-diameter spur gear 26, the large-diameter spur gear 25, and the driving gear 24, and the rotation shaft 21a rotates in the reverse-rotation direction. According to the rotation of the reverse-rotation direction of the rotation shaft 21a, the door opening/closing information generation circuit 54 outputs a direction signal D similar to that when the electric motor 21 is rotated and driven in the reverse direction (see FIG. 4C). The PWM command generation circuit 51b counts the direction signal D and determines that the slide door 12 moves to the CLOSE side because the vehicle 11 is parked downward when the counted number of pulses is greater than or equal to the number P2 of pulses (step ST3: Yes). On the other hand, the PWM command generation circuit 51b determines that the slide door 12 does not move to the CLOSE side when the counted number of pulses is less than the number P2 of pulses (step ST3: No).

Upon determining that the slide door 12 moves to the CLOSE side, the PWM command generation circuit 51b generates a PWM command signal so that the electric motor 21 rotates in the forward-rotation direction, that is, so that the pre-driver 52 outputs the driving signals H1 to H6 (PWM signals). The PWM command generation circuit 51b reads an initial value D2 of the duty of the driving signal output by the pre-driver 52 and a step value Du2 which is its increment amount from the ROM 53. The PWM command generation circuit 51b generates the PWM command signal by adding the step value Du2 to the initial value D 2 every time the number of pulses increases, and outputs the generated PWM command signal to the pre-driver 52. The pre-driver 52 drives the transistors 42a to 42f of the driving circuit unit 42 according to the driving signals H1 to H6 (PWM signals) based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST8). At this time, the electric current supply pattern is an electric current supply pattern (see FIG. 4B) for rotating the electric motor 21 in a forward-rotation direction.

The PWM command generation circuit 51b determines whether the slide door 12 has stopped (step ST9). The PWM command generation circuit 51b makes this determination by counting the number of pulses of the direction signal D (position signal pattern) input from the door opening/closing information generation circuit 54 and determining whether a count number increases. That is, the determination is made according to whether the number of pulses of the position signal D (the position signal pattern illustrated in FIG. 4C) of the reverse-rotation direction increases. When the counted number of pulses does not increase, the PWM command generation circuit 51b determines that the slide door 12 has stopped (step ST9: Yes). Thereby, the door holding process ends, and the electric motor 21 maintains the rotation state of the forward-rotation direction and maintains the stop state of the slide door 12.

On the other hand, when the counted number of pulses increases, the PWM command generation circuit 51b generates the PWM command signal so as to increase a rotation force in the forward-rotation direction of the electric motor 21, that is, so that the pre-driver 52 outputs the driving signals H1 to H6 (PWM signals). The PWM command generation circuit 51b outputs the PWM command signal generated by adding the step value Du2 to the initial value D2 to the pre-driver 52. The pre-driver 52 drives the transistors 42a to 42f of the driving circuit unit 42 according to a PWM signal in which the duty has increased based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST10). At this time, the electric current supply pattern is an electric current supply pattern (see FIG. 4B) for rotating the electric motor 21 in the forward-rotation direction. Until it is determined that the slide door 12 has stopped in the above-described step ST9, an operation of increasing the duty of the PWM signal is iterated and the rotation force in the forward-rotation direction of the electric motor 21 is increased.

The PWM command generation circuit 51b determines whether a preset determination period t1 has elapsed (step ST4). When the determination period t1 has not elapsed, a determination of whether the vehicle 11 is upward is made by returning to the above-described step ST2 (step ST4: No). When the determination period t1 has elapsed, the PWM command generation circuit 51b determines that the slide door 12 does not move due to gravity because the vehicle is on the flat ground and the door holding process ends.

In this manner, the motor control device 41 (motor control device) of this embodiment is an electric motor control device having the control circuit unit 50 (control unit) configured to output a forward-rotation command or a reverse-rotation command of the electric motor 21 (electric motor) to the electric motor. The control circuit unit 50 includes the door opening/closing information generation circuit 54 (position detector). The door opening/closing information generation circuit 54 detects the rotation direction of the electric motor 21 when the pulse signals Su, Sv, and Sw (detection signals) are input from the Hall ICs 48u, 48v, and 48w (rotation sensors), which detect the rotation of the electric motor 21, while no electric current is supplied to the electric motor 21. In addition, an electric current supply device (PWM command generation circuit 51b) configured to supply an electric current by which the electric motor 21 is rotated in an opposite direction to the detected rotation direction by increasing an electric current supply duty every time the detection signal is switched is included.

Thereby, according to the motor control device of this embodiment, the slide door 12 is stopped by a regenerative braking force (electric braking force) of the electric motor 21 (step ST1). Although the slide door 12 moves in the opening/closing direction due to gravity on the sloping ground, the control unit (control circuit unit 50) stops the movement of the slide door 12 by rotating and driving the electric motor in an opposite direction to a direction thereof. Thereby, it is possible to provide the motor control device 41 capable of performing a control process of stopping the movement of the slide door 12, for example, on the sloping ground, or the like through the rotation sensor, the position detector, and the electric current supply device without using a tilt sensor.

[Second Embodiment]

In the description of the above-described embodiment, the cycles of driving signals H1 to H6 (PWM signals) output by a pre-driver 52 are set by a control circuit unit 50 setting a frequency (hereinafter referred to as a PWM carrier frequency) of a carrier (PWM carrier signal) of a PWM signal. A rotation command unit 51 can set a cycle of the PWM signal including a period of a sum of an ON period and an OFF period of a switching element (transistors 42a to 42o as a variable cycle by including a carrier frequency in a PWM command signal and outputting the PWM command signal to the pre-driver 52.

Incidentally, the switching element generates heat at the time of switching from OFF to ON and at the time of switching from ON to OFF. When the same carrier frequency is set in a normal operation (slide-door opening/closing operation) and an operation (door holding process operation) of gradually increasing and controlling the above-described electric current supply duty, the heat generation to the same degree as that at the opening/closing operation time of the slide door is generated by the switching element even when the door holding process operates. Because of this, when the slide-door opening/closing operation is performed after the door holding process operation is performed, it is difficult to accurately perform the above-described door holding process operation itself according to an increase of the temperature of a switching element or the like constituting the motor control device 41, that is, it may be difficult to exhibit the original performance of the door holding process operation or the motor control device 41 itself may fail.

Therefore, an example in which a PWM carrier frequency is reduced for a normal operation and the heat generation of the motor control device 41 by the switching operation is reduced will be described in the second embodiment.

Figure 6:
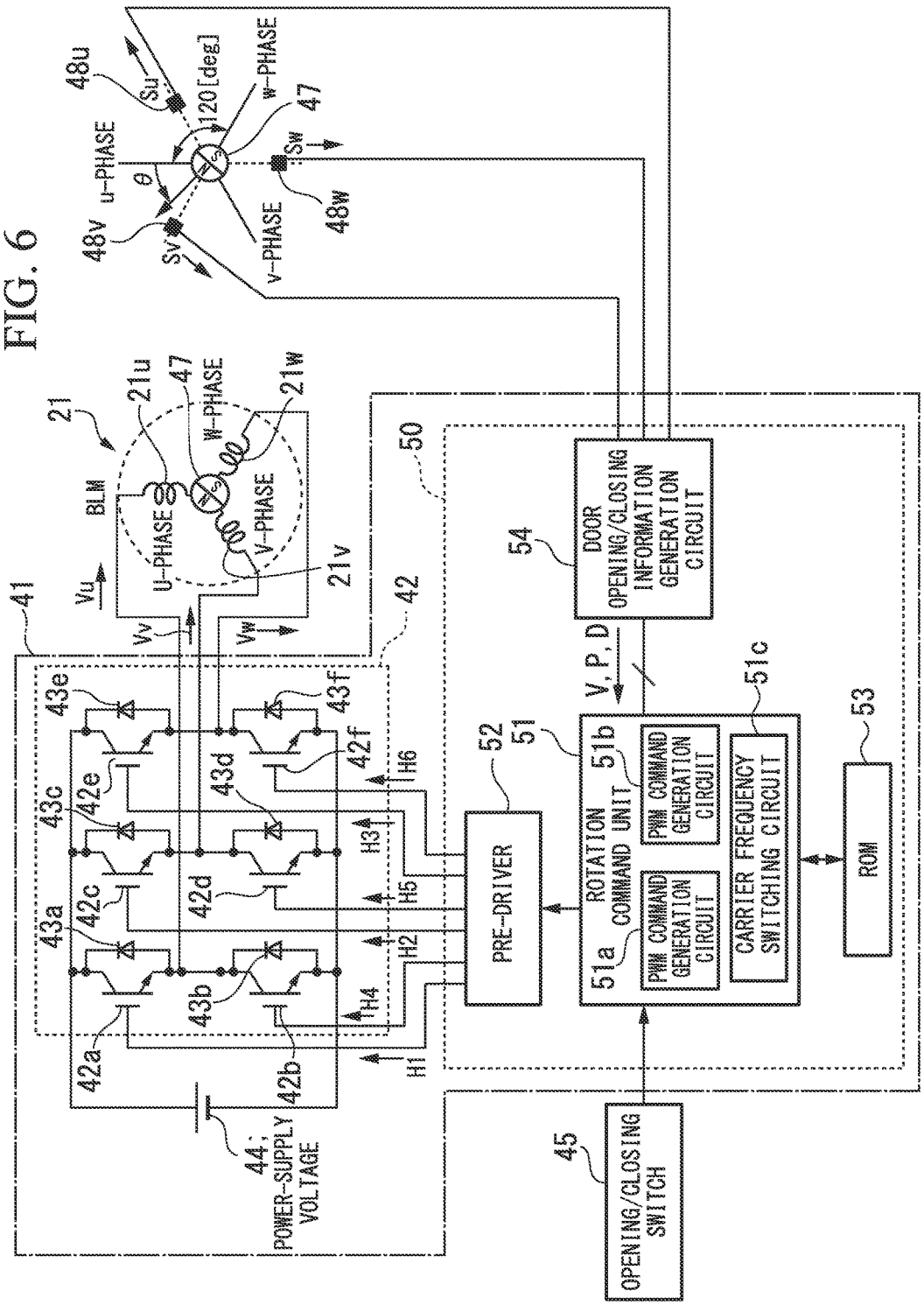
FIG. 6 is a circuit diagram illustrating details of a motor control device 41 and an electric motor 21 in a second embodiment.
Figure 7:
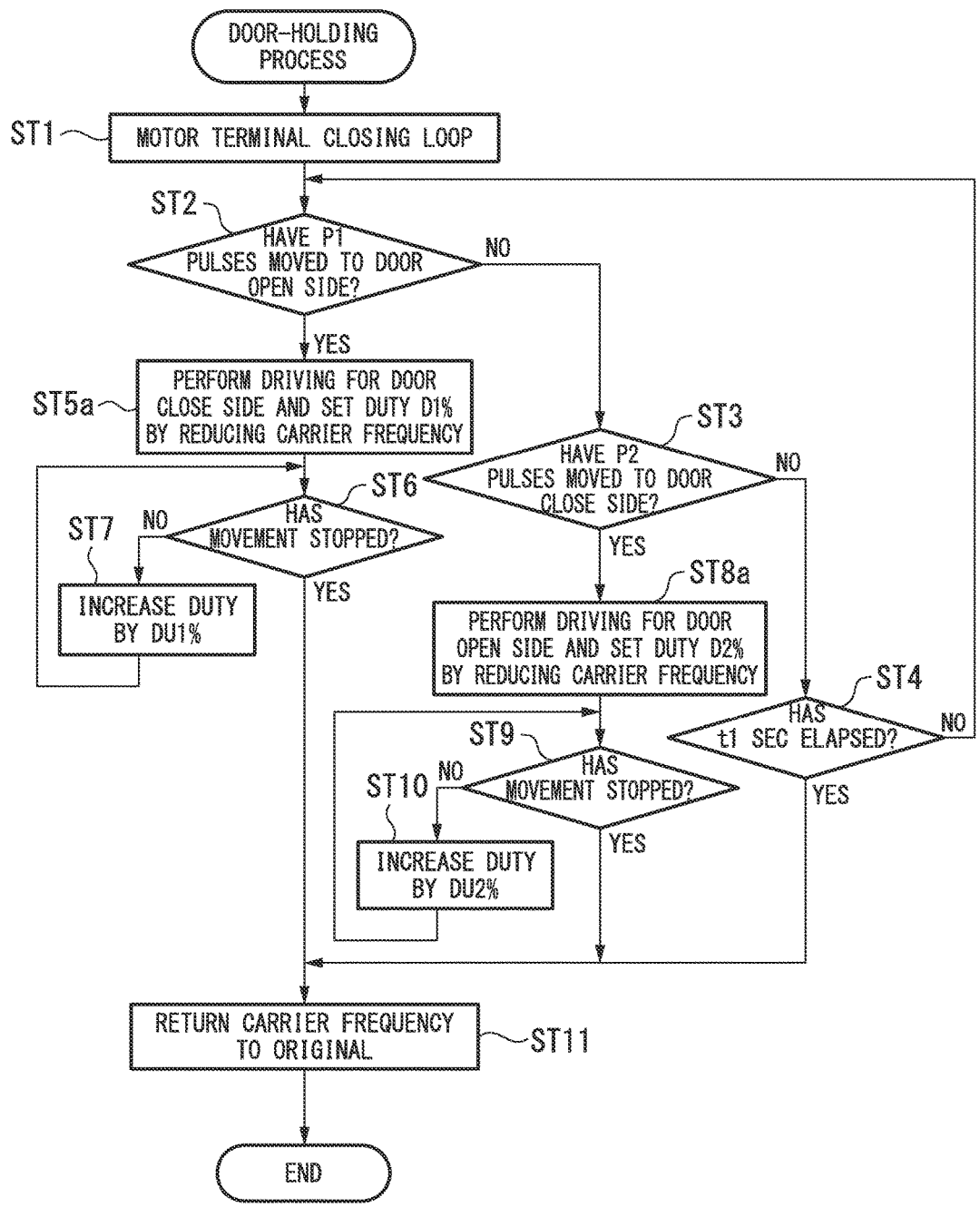
FIG. 7 is a flowchart diagram illustrating a control procedure of decreasing a carrier frequency in a door holding process operation.

FIG. 6 is a circuit diagram illustrating details of the motor control device 41 and the electric motor 21 in a second embodiment. In addition, FIG. 7 is a flowchart diagram illustrating a control procedure of decreasing a carrier frequency in a door holding process operation. Also, the same elements in FIG. 6 as those in FIG. 3 are denoted by the same reference signs and the description thereof will be omitted. In addition, the same elements in FIG. 7 as those in FIG. 5 are denoted by the same reference signs and the description thereof will be omitted. Hereinafter, the details of differences of the control of the motor control device 41 illustrated in FIG. 6 from the control flow illustrated in FIG. 5 will be described with reference to FIG. 7.

In the motor control device 41 illustrated in FIG. 6, the rotation command unit 51 is configured to further include a carrier frequency switching circuit 51c (carrier frequency switcher) in addition to a PWM command generation circuit 51a and a PWM command generation circuit 51b.

When the PWM command generation circuit 51b determines that a slide door 12 moves to the OPEN side or the CLOSE side (step ST2: Yes or step ST3: Yes), the carrier frequency switching circuit 51c controls a carrier frequency of the PWM command signal output by the PWM command generation circuit 51b to the pre-driver 52 to be switched to a frequency which is lower than that of the normal operation. According to this control, the pre-driver 52 can decrease the carrier frequencies (carrier frequencies of electric current supply) of the driving signals H1 to H6 output to the switching elements (the transistors 42a to 42o constituting the driving circuit unit 42, that is, the pre-driver 52 can lengthen the carrier cycles. Thereby, a switching frequency of the driving circuit unit 42 is decreased and an increase in a temperature by the heat generation of the motor control device 41 of the switching element can be prevented.

Referring to FIG. 7, the PWM command generation circuit 51b in the rotation command unit 51 outputs a PWM command signal in which the driving signals H1 to H3 (or the driving signals H4 to H6) have a duty of 100% to the pre-driver 52 when the crew or the like instructs to stop the slide door 12 during opening/closing of the slide door 12 by operating the opening/closing switch 45 (step ST1). At this time, the carrier frequency of the PWM command signal is a carrier frequency of a normal operation. The pre-driver 52 turns on IGBTs 42a, 42c, and 42e (or 42b, 42d, and 42o) of the driving circuit unit 42, and the short-circuits stator wires 21u, 21v, and 21w. The electric motor 21 transitions to the rotation stop state and regenerative braking occurs and operates to stop the slide door 12 by applying an electric braking force to the slide door 12.

Upon determining that the slide door 12 moves to the OPEN side (step ST2: Yes), the PWM command generation circuit 51b generates a PWM command signal so that the electric motor 21 rotates in the reverse-rotation direction, that is, so that the pre-driver 52 outputs the driving signals H1 to H6 (PWM signals). Because of this, the PWM command generation circuit 51b reads an initial value D1 of the duty of the driving signal output by the pre-driver 52 and a step value Du1 which is its increment amount from the ROM 53. In addition, the carrier frequency switching circuit 51c switches a carrier frequency of the PWM command signal to a frequency which is lower than that of the normal operation. Thereby, the PWM command generation circuit 51b outputs the PWM command signal of the carrier frequency, which is lower than that of the normal operation, generated based on the initial value D1 to the pre-driver 52. The pre-driver 52 drives the transistors 42a to 42f of the driving circuit unit 42 according to the driving signals H1 to H6 (PWM signals) based on the input PWM command signal. The driving circuit unit 42 performs a switching operation according to the driving signals H1 to H6 input from the pre-driver 52, and the supplies stator wires U, V, and W with a power-supply voltage of the DC power supply 44 applied to the driving circuit unit 42 as the applied voltages Vu, Vv, and Vw (step ST5a). At this time, the electric current supply pattern is an electric current supply pattern (see FIG. 4C) for rotating the electric motor 21 in the reverse-rotation direction. In addition, because the carrier frequency of the PWM signal is lower than that of the normal operation, the switching operation by the driving signals H1 to H6 in the driving circuit unit 42 is performed at a frequency which is lower than that of the normal operation. Thereafter, in step ST11, the switching operation by the driving signals H1 to H6 in the driving circuit unit 42 is performed at the frequency which is lower than that of the normal operation until the carrier frequency returns to a normal frequency.

Until it is determined that the slide door 12 has stopped (step ST6: Yes), the PWM command generation circuit 51b counts the number of pulses of the direction signal D (position signal pattern) input from the door opening/closing information generation circuit 54 and generates a PWM command signal so that a rotation force for the reverse-rotation direction of the electric motor 21 increases, that is, so that the pre-driver 52 outputs the driving signals H1 to H6 (PWM signals), when the counted number of pulses increases. The PWM command generation circuit 51b generates the PWM command signal by adding the step value Du1 to the initial value D1 every time the number of pulses increases, and outputs the generated PWM command signal to the pre-driver 52. At this time, the carrier frequency of the PWM command signal is set to a carrier frequency which is lower than that of the normal operation. The pre-driver 52 drives the transistors 42a to 42f of the driving circuit unit 42 according to a PWM signal in which the duty has increased based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST7). At this time, the electric current supply pattern is an electric current supply pattern (see FIG. 4C) for rotating the electric motor 21 in the reverse-rotation direction. Until it is determined that the slide door 12 has stopped in the above-described step ST6 (step ST6: Yes), an operation of increasing the duty of the PWM signal is iterated and the rotation force in the reverse-rotation direction of the electric motor 21 is increased. In addition, the carrier frequency of the PWM signal is lower than that of the normal operation. Because of this, the switching operation by the driving signals H1 to H6 in the driving circuit unit 42 when the rotation force for the reverse-rotation direction of the electric motor 21 increases is performed at a frequency which is lower than that of the normal operation.

On the other hand, upon determining that the slide door 12 moves to the CLOSE side (step ST3: Yes), the PWM command generation circuit 51b generates a PWM command signal so that the electric motor 21 rotates in the forward-rotation direction, that is, so that the pre-driver 52 outputs the driving signals H1 to H6 (PWM signals). The PWM command generation circuit 51b reads an initial value D2 of the duty of the driving signal output by the pre-driver 52 and a step value Du2 which is its increment amount from the ROM 53. In addition, the carrier frequency switching circuit 51c switches the carrier frequency of the PWM command signal to a frequency which is lower than that of the normal operation. Thereby, the PWM command generation circuit 51b outputs the PWM command signal of the carrier frequency, which is lower than that of the normal operation, generated based on the initial value D2 to the pre-driver 52. The pre-driver 52 drives the transistors 42a to 42f of the driving circuit unit 42 according to the driving signals H1 to H6 (PWM signals) based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST8a). At this time, the electric current supply pattern is an electric current supply pattern (see FIG. 4B) for rotating the electric motor 21 in a forward-rotation direction. In addition, because the carrier frequency of the PWM signal is lower than that of the normal operation, the switching operation by the driving signals H1 to H6 in the driving circuit unit 42 is performed at a frequency which is lower than that of the normal operation. Thereafter, in step ST11, the switching operation by the driving signals H1 to H6 in the driving circuit unit 42 is performed at the frequency which is lower than that of the normal operation until the carrier frequency returns to a normal frequency.

Until it is determined that the slide door 12 has stopped (step ST9: Yes), the PWM command generation circuit 51b counts the number of pulses of the direction signal D (position signal pattern) input from the door opening/closing information generation circuit 54, and generates a PWM command signal so that a rotation force for the forward-rotation direction of the electric motor 21 increases, that is, so that the pre-driver 52 outputs the driving signals H1 to H6 (PWM signals), when the counted number of pulses increases. The PWM command generation circuit 51b outputs the PWM command signal generated by adding the step value Du2 to the initial value D2 to the pre-driver 52. At this time, the carrier frequency of the PWM command signal is set to a carrier frequency which is lower than that of the normal operation. The pre-driver 52 drives the transistors 42a to 42f of the driving circuit unit 42 according to the PWM signal in which the duty has increased based on the input PWM command signal. The driving circuit unit 42 performs the switching operation according to the driving signals H1 to H6 input from the pre-driver 52, and supplies the stator wires U, V, and W with the power-supply voltage of the DC power supply 44 applied to the driving circuit unit 42 as the applied voltages Vu, Vv, and Vw (step ST10). At this time, the electric current supply pattern is an electric current supply pattern (see FIG. 4B) for rotating the electric motor 21 in the forward-rotation direction. Until it is determined that the slide door 12 has stopped in the above-described step ST9 (step ST9: Yes), an operation of increasing the duty of the PWM signal is iterated and the rotation force in the forward-rotation direction of the electric motor 21 is increased. In addition, the carrier frequency of the PWM signal is lower than that of the normal operation. Because of this, the switching operation by the driving signals H1 to H6 in the driving circuit unit 42 when the rotation force for the forward-rotation direction of the electric motor 21 increases is performed at a frequency which is lower than that of the normal operation.

When the PWM command generation circuit 51b determines that the vehicle 11 is on the flat ground and the slide door 12 is not moved due to gravity in either step ST6 or ST9, the carrier frequency switching circuit 51c returns the carrier frequency of the PWM command signal to the carrier frequency of the normal operation (step ST11). In addition, a door holding process ends.

In this manner, in the second embodiment, the control circuit unit 50 (control unit) further includes the carrier frequency switching circuit 51c (carrier frequency switcher), and the control unit controls the carrier frequency (a carrier frequency of the PWM signal) of the electric current supply at which the motor rotates to be decreased by the carrier frequency switcher when the rotation of the electric motor is detected while no electric current is supplied to the electric motor (electric motor 21).

Thereby, in the door holding process operation, it is possible to decrease a PWM carrier frequency for the normal operation and reduce the heat generation of the motor control device 41 by the switching operation. Thereby, because it is possible to prevent the temperature of the motor control device 41 from increasing, it is possible to sufficiently exhibit original performance of the door holding process operation and prevent the motor control device 41 itself from malfunctioning.

The technical ideas of the present invention are applicable to a motor control device. Furthermore, the circuitry form within each circuit block disclosed in the drawings, as well as a circuit that generates the other control signals, is not limited to the circuitry form disclosed in the examples. Within the range of the claims of the present invention, various disclosed components can be combined or selected in various ways. That is, various alterations and modifications that a person of ordinary skill in the art can make in accordance with all information disclosed, including the claims and the technical ideas, are within the scope of the present invention.

For example, the case in which the opening/closing device 14 when the rotation shaft 21a and the output shaft 27 are in the same direction has been described in the description of this embodiment. However, this is only an example, and the technical ideas of the present invention are applicable even when the rotation shaft and the output shaft of the electric motor 21 are in the vertical direction as in the door opening/closing device disclosed in Patent Literature 1.

INDUSTRIAL APPLICABILITY

According to the above-described motor control device, the slide door is stopped by regenerative braking of the electric motor. When the slide door is on the sloping ground, the slide door moves in an opening/closing direction due to gravity, but the control unit stops the movement of the slide door by rotating and driving the electric motor in an opposite direction to a movement direction due to gravity. Thereby, it is possible to provide a motor control device capable of performing a control process of stopping the movement of the slide door, for example, on sloping ground, or the like, through the rotation sensor, the position detector, and the electric current supply device without using the tilt sensor.

REFERENCE SIGNS LIST

11 Vehicle
12 Slide door
13 Guide rail
14 Door opening/closing device
15 Driving unit
16 Cable
17, 18 Reversing pulley
21 Electric motor
21a Rotation shaft
21u, 21v, 21w Stator wire
24 Driving gear
25 Large-diameter spur gear
26 Small-diameter spur gear
27 Output shaft
28 Driven gear
31 Drum
32 Tensioner
32a Fixed pulley
32b Movable pulley
32c Spring member
41 Motor control device
42 Driving circuit unit
42a, 42b, 42c, 42d, 42e, 42f Transistor
43a, 43b, 43c, 43d, 43e, 43f Flywheel diode
44 DC power supply
50 Control circuit unit
51 Rotation command unit
51a, 51b PWM command generation circuit
51c Carrier frequency switching circuit
52 Pre-driver
53 ROM
54 Door opening/closing information generation circuit
48u, 48v, 48w Hall IC
Su, Sv, Sw Pulse signal
H1, H2, H3, H4, H5, H6 Driving signal
Vu, Vv, Vw Applied voltage

The invention claimed is:

1. A motor control device for controlling an electric motor, the motor control device comprising:
  a control unit configured to output a forward-rotation command or a reverse-rotation command to the electric motor, and
  the motor control device being configured to drive an openable/closable body, wherein no clutch is provided between the electric motor and the openable/closable body,
  the motor control device comprising:
    a driving circuit unit;
    a power-supply voltage; and
    the control unit,
  wherein the control unit comprises:
    a position detector configured to detect a rotation direction of the electric motor when a detection signal is input from a rotation sensor, which detects the rotation of the electric motor while no current is supplied to the electric motor; and
    an electric current supply device configured to supply an electric current that drives the electric motor in an opposite direction to the detected rotation direction with an electric current supply duty,
  wherein the control unit short-circuits the terminal of the electric motor to stop the openable/closable body when a signal that commands to stop the openable/closable body is input based on an operation of an opening/closing stop switch during opening/closing of the openable/closable body,
  wherein the control unit switches stopping the openable/closable body to the electric current supply device when the position detector detects the rotation direction of the electric motor even where the command to stop the openable/closable body is input during opening/closing of the openable/closable body, and
  wherein the electric current supply device continues to supply the electronic current until the openable/closable body stops.

2. The motor control device according to claim 1, wherein the control unit causes the electric motor to generate an electric braking force in a rotation stop state of the electric motor and causes the electric motor to rotate in an opposite direction to the rotation direction of the electric motor by increasing the current supply duty.

3. The motor control device according to claim 1,
  wherein the control unit further comprises:
    a carrier frequency switcher, and
  wherein, when the rotation of the electric motor is detected while no electric current is supplied to the electric motor, the control unit controls a carrier frequency of the electric current supply at which the motor rotates to be decreased by the carrier frequency switcher.

4. The motor control device according to claim 2, wherein the control unit further comprises a carrier frequency switcher, and wherein, when the rotation of the electric motor is detected while no electric current is supplied to the electric motor, the control unit controls a carrier frequency of electric current supply at which the motor rotates to be decreased by the carrier frequency switcher.

5. A driving unit comprising:
  an electric motor having a rotation sensor and wherein no clutch is provided between the electric motor and an openable/closable body; and
  a motor control device that outputs commands to drive the openable/closable body,
  wherein the motor control device comprises:
    a position detector; and
    circuitry that:
      during opening/closing of the openable/closable body, short-circuits a terminal of the electric motor to stop the openable/closable body,
      when the position detector detects a rotation direction of the electric motor after signal of command to stop the openable/closable body is input during opening/closing of the openable/closable body, supplies electric current that drives the electric motor in an opposite direction to the detected rotation direction; and continues to supply the electric current until the openable/closable body stops.

\* \* \* \* \*